United States Patent
Girard et al.

(10) Patent No.: US 8,622,703 B2
(45) Date of Patent: Jan. 7, 2014

(54) BLADE PROVIDED WITH A DRAG DAMPER, AND A ROTOR PROVIDED WITH SUCH A BLADE

(75) Inventors: Vincent Girard, Venelles (FR); Stéphane Mazet, Munich (DE); Rémi Metivier, Montdauphin (FR); Alain Eberhard, Velaux (FR)

(73) Assignee: Eurocopter, Marignane Cedex (FR)

( * ) Notice: Subject to any disclaimer, the term of this patent is extended or adjusted under 35 U.S.C. 154(b) by 935 days.

(21) Appl. No.: 12/730,554

(22) Filed: Mar. 24, 2010

(65) Prior Publication Data

US 2010/0247312 A1 Sep. 30, 2010

(30) Foreign Application Priority Data

Mar. 27, 2009 (FR) ..................................... 09 01466

(51) Int. Cl.
*F01D 5/00* (2006.01)
(52) U.S. Cl.
USPC .................................. 416/134 A; 416/134 R
(58) Field of Classification Search
USPC .......... 416/134 A, 134 R, 133, 135, 136, 148, 416/103, 106
See application file for complete search history.

(56) References Cited

U.S. PATENT DOCUMENTS

| | | | | |
|---|---|---|---|---|
| 4,549,850 A | * | 10/1985 | Vincent | ........................ 416/140 |
| 4,690,616 A | | 9/1987 | Hahn et al. | |
| 5,141,398 A | * | 8/1992 | Bietenhader et al. | ......... 416/107 |
| 5,407,325 A | * | 4/1995 | Aubry | ........................... 416/106 |
| 2003/0012650 A1 | * | 1/2003 | Ferullo | ........................ 416/106 |
| 2007/0280828 A1 | * | 12/2007 | Bianchi et al. | ............ 416/134 A |
| 2008/0069695 A1 | * | 3/2008 | Jones et al. | .................... 416/103 |

FOREIGN PATENT DOCUMENTS

| | | |
|---|---|---|
| EP | 0 424 267 | 4/1991 |
| FR | 2 898 581 | 9/2007 |

OTHER PUBLICATIONS

French Search Report dated Dec. 8, 2009, from corresponding French application.

* cited by examiner

*Primary Examiner* — Nathaniel Wiehe
*Assistant Examiner* — Su Htay
(74) *Attorney, Agent, or Firm* — Brooks Kushman P.C.

(57) ABSTRACT

The present invention relates to a rotorcraft blade (1) provided with at least one spar (3) and an outer covering (4), said blade (1) including a hollow sleeve (10) with a wall (11) that is provided at least with said outer covering (4) secured to said spar (3). The blade includes a rotary damper (20) provided with an inner tubular strength member (21) and an outer tubular strength member (22) that are coaxial and connected together by a ring (23) of viscoelastic material, said inner tubular strength member (21) being secured to said covering (4), and said outer tubular strength member (22) being provided with a fork (25) possessing first and second tines (26, 27) facing each other so as to be suitable for receiving a first ball joint (41) close to the pitch-variation axis (AX1) of said blade (1).

16 Claims, 3 Drawing Sheets

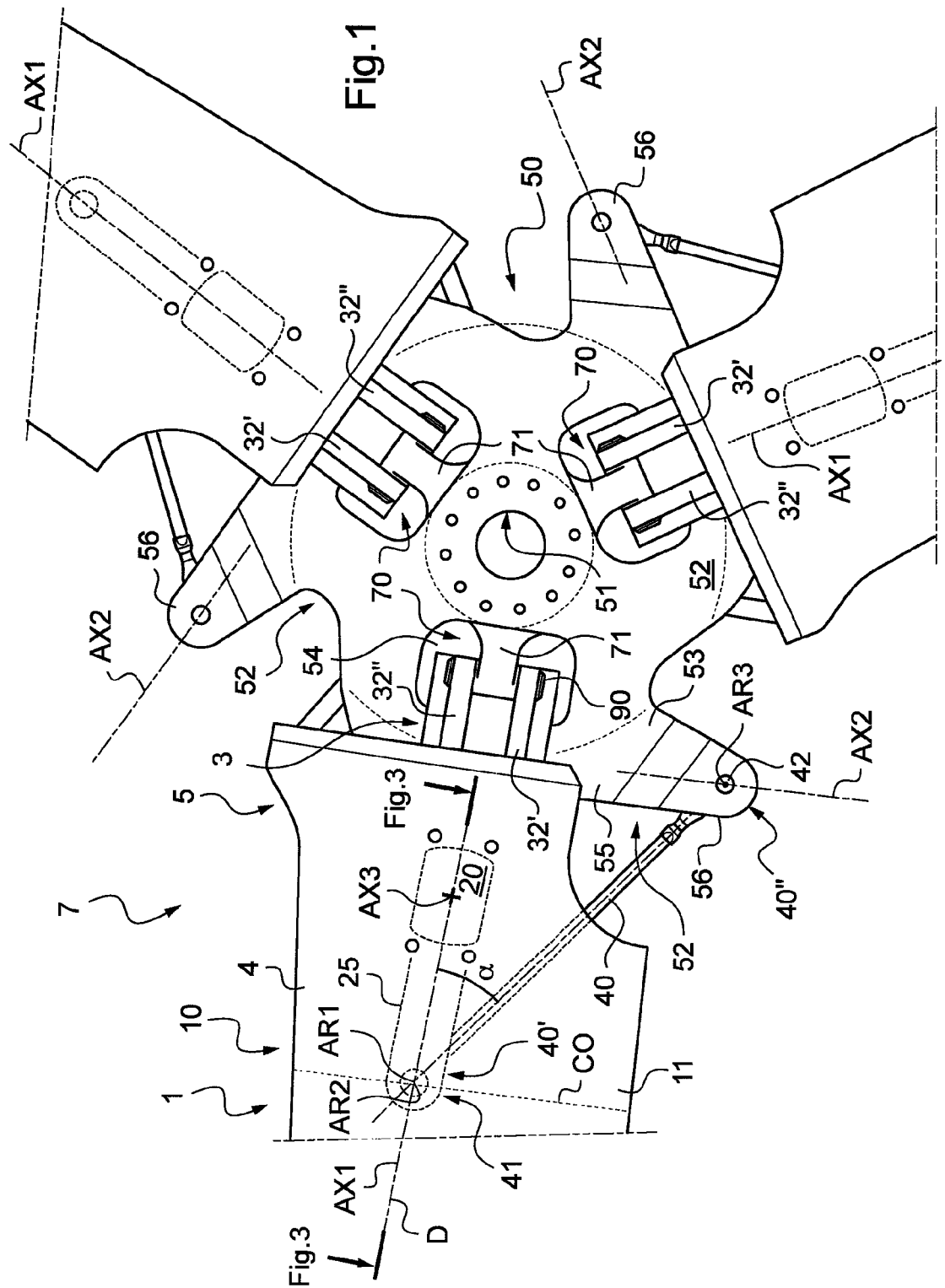

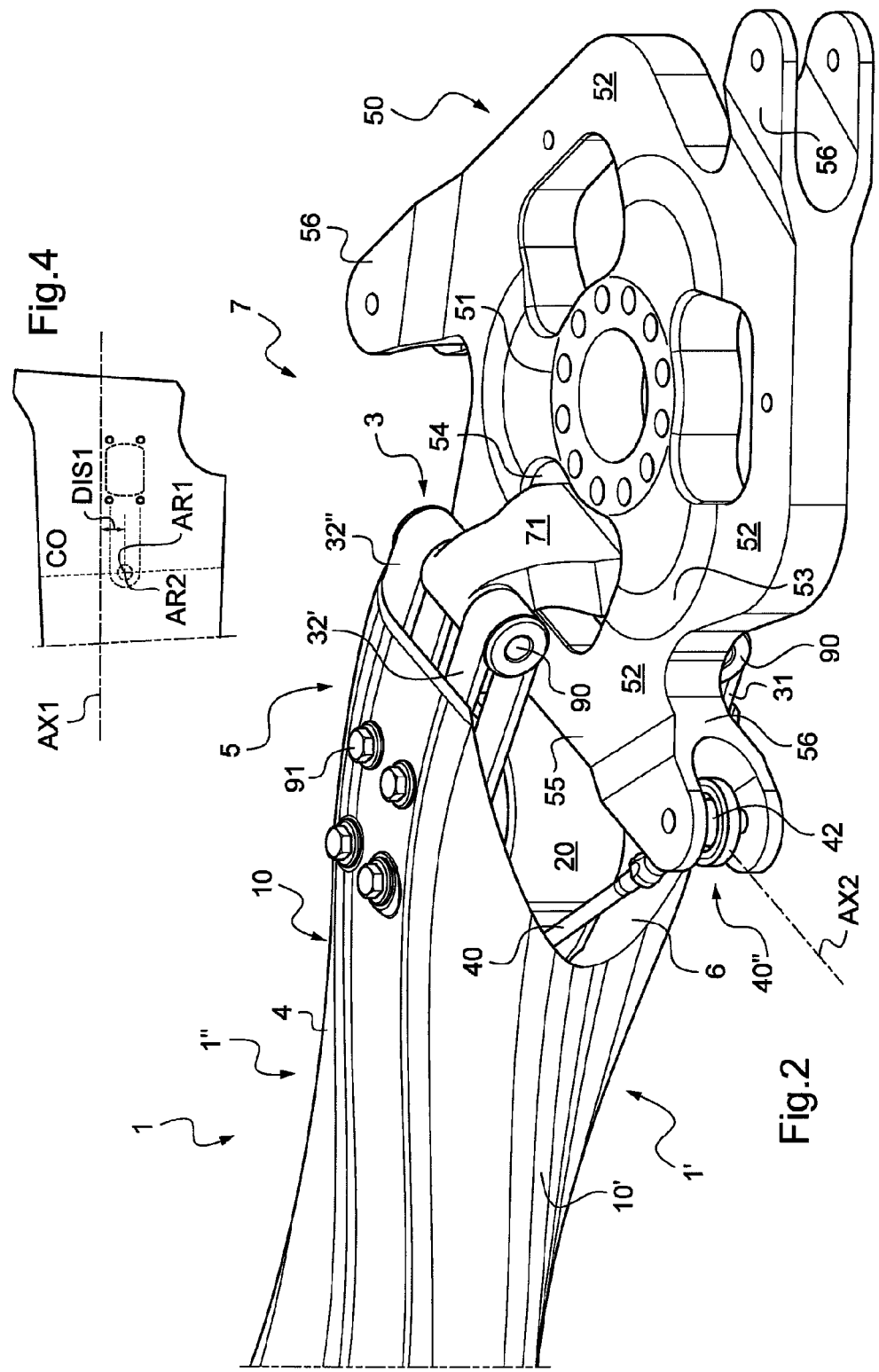

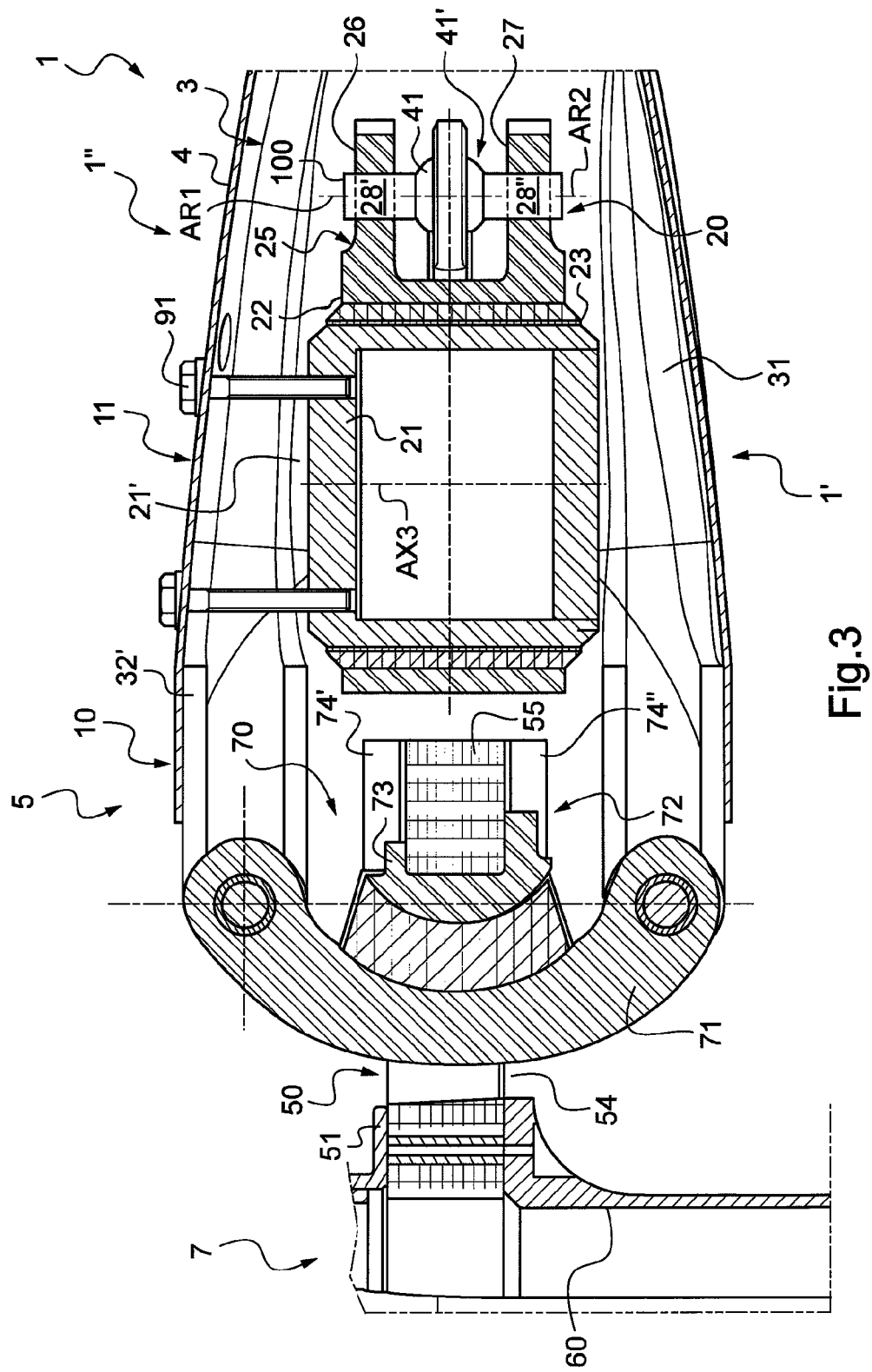

BLADE PROVIDED WITH A DRAG DAMPER, AND A ROTOR PROVIDED WITH SUCH A BLADE

FIELD OF THE INVENTION

The present invention relates to a blade provided with a drag damper, and to a rotor provided with such a blade.

More particularly, the invention lies in the technical field of damping drag movements of a blade.

BACKGROUND OF THE INVENTION

Conventionally, a rotorcraft rotor comprises a hub driven in rotation about an axis of revolution by an outlet shaft of a power transmission main gearbox, also referred to as a drive shaft, together with at least three blades fastened to the hub via appropriate hinges, in particular via respective laminated spherical abutments dedicated to each of the blades.

On the assumption that each blade is fixed relative to the hub, it should be recalled that the rotor constituted in this way is a rigid rotor. While hovering, the distribution of aerodynamic forces along a blade gives rise to a bending moment distribution presenting a very large value at the root of the blade. When flying in translation, the blade that is said to be "advancing" carries more than the blade that is said to be "retreating" because of the unequal air speeds as described in greater detail below.

Consequently, the resultant of the aerodynamic forces exerted on a blade does not have the same value in each direction, nor even the same point of application: the fixed-end or "restrained" bending moments at the root of the blade is thus high and variable, thereby generating alternating mechanical stresses leading to a fatigue phenomenon that is harmful for the materials. Furthermore, the resultant of the aerodynamic forces from all of the blades is no longer carried by the axis of the rotor, thereby creating a roll moment that increases with increasing speed and that can make it difficult to balance forces while flying in translation.

In order to remedy those drawbacks, it is known to hinge the blades to the hub about respective axes that are perpendicular to the drive shaft and referred to as the vertical flapping axes that correspond to a vertical flapping hinge capable of transferring a force of arbitrary orientation but not capable under any circumstances of transferring a moment. Consequently, if the blade is hinged to the hub, the bending moment where it is attached is zero. To achieve blade equilibrium, centrifugal forces keep the blade in place after it has risen a certain amount, thereby producing a cone shape of angle $a_0$.

Under such conditions, there is no longer a large amount of roll moment when flying in translation and the blades no longer revolve in a plane, rather their outer ends describe a very flat cone. In practice, the flapping axis is then not on the axis of revolution but is offset therefrom by a distance a, referred to as the eccentricity.

It should also be recalled that in order to provide a helicopter with lift in its various different configurations, it is necessary to be able to control the lift provided by the rotor and to vary it. That is why a pitch hinge is provided of axis that is substantially parallel to the span of the corresponding blade. This new degree of freedom enables the lift of the blade to be controlled by acting on a general pitch control, and also enables pitch to be caused to vary cyclically, thus serving to control the plane of rotation of the blades, which blades then describe a cone of axis that no longer coincides with the drive axis: the resultant of the forces applied to the hub changes direction whenever the plane of the rotor changes direction. This gives rise to moments about the center of gravity of the helicopter, thus enabling it to be piloted.

As mentioned above, the plane of rotation of the blades may be different from a plane that is perpendicular to the drive shaft. Under such conditions, it is necessary to hinge each blade in drag since the end of each blade is at a variable distance from the rotor shaft. Otherwise, inertial forces would necessarily appear, giving rise to alternating bending moments in the plane of each blade. Such a drag hinge is provided by hinging the blade about a drag axis that is substantially parallel to the axis of the rotor, and consequently substantially perpendicular to drag forces. To enable such a blade to be driven from the drive shaft, it is naturally necessary for the drag hinge to be far enough away from the rotor axis to ensure that the moment due to centrifugal forces balances the moment due to drag and inertial forces, thus requiring the drag axis to be offset by an eccentricity e, and with this requiring that the "drag" angle $\delta$ is not too great.

Consequently, the blades of a hinge rotor of a rotary wing aircraft, in particular a helicopter, can describe the following four movements:

i) rotation about the axis of the rotor;

ii) vertical rotation about the flapping axis, made possible by the vertical flapping hinge;

iii) horizontal rotation about the drag axis, also referred to as the horizontal flapping axis, made possible by the horizontal flapping hinge or drag hinge; and iv) rotation about the axis of the blade made possible by a pitch hinge (not specific to hinged rotors).

As described in patent FR 2 497 073, for example, the above three rotations ii), iii), and iv) may be made possible by a single member such as a laminated spherical abutment.

Nevertheless, the oscillations of each blade about its drag axis can become coupled in unstable manner with the elastic deformation modes or movements of the airframe, in particular oscillations of the helicopter while standing on the ground via its landing gear: this is the origin of the so-called "ground resonance" phenomenon that can be dangerous for the aircraft when the resonant frequency of the oscillation of the blades about their drag axis is close to one of the resonant frequencies of the oscillations of the aircraft relative to its landing gear.

The remedies for that phenomenon consist in introducing damping on the drag axes by means of a damper type device.

Such dampers have resilient return means of determined damping and stiffness for combating resonance phenomena, in particular ground resonance phenomena and also drive system resonance phenomena, that can appear in particular on helicopters.

When the blades of the rotor are excited in drag, the blades move away from their equilibrium positions and may become unevenly distributed in the circumferential direction, thereby creating an unbalance by moving the center of gravity of the rotor away from its axis of rotation. Furthermore, blades that are spaced apart from their equilibrium positions oscillate about said positions at a frequency $\omega_\delta$, which is the resonant frequency of the blades in drag, also referred to as the first drag mode or as the resonant mode in drag.

If $\Omega$ is the frequency of rotation of the rotor, it is known that the fuselage of the helicopter is thus excited at the frequencies $|\Omega \pm \omega_\delta|$.

When standing on the ground via its landing gear, the fuselage of the helicopter constitutes a mass-spring-damper system comprising a mass suspended above the ground by a spring, and a damper in each undercarriage. With the fuselage resting on its landing gear, there are therefore resonant modes in vibration in roll and in pitching. There is thus a risk of ground instability when the excitation frequency $|\Omega+\omega_\delta|$ or $|\Omega-\omega_\delta|$ of the fuselage on its landing gear is close to the resonant frequency of oscillation, which corresponds to the so-called ground resonance phenomenon. To avoid instability, it is known to begin by seeking to avoid any occasion on which these frequencies cross, and if such crossing cannot be avoided, then the fuselage on its undercarriage must be damped sufficiently, as must the blades of the main rotor in their drag movements.

Consequently, the stiffness of the drag dampers of the blades of a main rotor needs to be selected so that the resonant frequency of the blades in drag lies outside a potential ground resonance zone, while simultaneously also providing sufficient damping, since when the speed of rotation of the rotor passes through the critical speed, both when speeding up and when slowing down, the movements of the blades must be damped sufficiently to avoid entering into resonance.

That is why drag dampers having resilient return means of determined stiffness are also referred to as frequency adapters.

In general, the stiffness of the damper determines an equivalent angular stiffness that opposes angular flapping of the blades relative to the hub about their drag axes. It is thus possible to increase the frequency of the resonant mode of the blades in drag in order to move that frequency away from the two above-mentioned resonance phenomena.

The equivalent angular stiffness is proportional to the square of the lever arm between the damper and the drag axis of the blade, i.e. the distance between the drag axis and the axis passing through the centers of the two ball joints of the damper, where such ball joints are necessary in this application.

Document FR 2 653 405 presents two different configurations for such dampers.

Thus, according to that document, the head of the rotor is provided with means including an annular central portion, an intermediate portion provided with one cavity per blade, and then a peripheral portion.

Each blade is then secured via its root to a sleeve that is fastened on a laminated spherical abutment arranged in one of said cavities.

Furthermore, in a first embodiment, one rotary damper per blade is secured to the peripheral portion of the hub. The rotary damper is then a resilient return member with incorporated damping due to shear in a viscoelastic material presenting very high deformation remanence.

In order to be able to damp the drag movement of a blade, the rotary damper is connected by a connecting rod to a sleeve of the blade. To guarantee good operation, each connecting rod is then substantially perpendicular to a direction passing via its point fastened to the fork of the associated rotary damper and the axis of revolution of said rotary damper.

That first embodiment is suitable for rotorcraft provided with a rotor having three blades.

Since the lever arm of that device is relatively small, it is appropriate to use a rotary damper that is overdimensioned and thus bulky.

Thus, for rotorcraft having a rotor with four or more blades, document FR 2 653 405 proposes a second embodiment.

In that second embodiment, a rotary damper is fastened inside each sleeve, the rotary damper of a blade being connected to an adjacent blade by a connecting rod.

Compared with a more conventional configuration in which the dampers are interposed between each blade and the hub of the rotor, the inter-blade configuration of a damper enables the lever arm to be increased between the dampers and the drag axes of the blades, but it also causes two dampers to participate with each blade in order to avoid ground resonance. The stiffness of each damper may be limited accordingly, and one resulting advantage is a lower level of static force introduced by mounting each damper as an inter-blade adapter. That configuration is therefore very favorable for combating ground resonance.

However, inter-blade mounting does not serve to damp overall drag movements and therefore requires drag abutments in order to avoid damage when the rotor is starting, and above all when it is braking.

Consequently, the prior art provides two distinct and alternative embodiments, namely:

arranging a rotary damper on the hub that is connected to the sleeve of a blade by means of a connecting rod; or arranging a rotary damper in the sleeve of a blade, which rotary damper is connected by a connecting rod to an adjacent blade.

Each embodiment then presents its own advantages and drawbacks.

Nevertheless, independently of the embodiment that is selected, coupling is observed between pitch and flapping. A flapping movement of the blade gives rise to a modification to its pitch. Likewise, a modification to the pitch of the blade under the control of the pitch control rod gives rise to a flapping movement of the blade.

This coupling between pitch and flapping arises mainly because of the particular positioning of the pitch control rod of the blade relative to the flapping and pitch axes of the blade.

Furthermore, it is observed that varying the pitch of the blade gives rise to excessive stress on the rotary damper.

OBJECT AND SUMMARY OF THE INVENTION

An object of the present invention is thus to provide a blade and a rotor provided with such blades that make it possible to overcome the above-mentioned limitations, in particular by limiting the excessive stresses on the damper, without acting on the phenomenon of coupling between the pitch and the flapping of a blade.

According to the invention, a rotorcraft blade that is provided with at least one spar and an outer covering, said blade having a hollow sleeve with a wall that is at least provided with said outer covering secured to said spar, is remarkable in that it includes a rotary damper provided with an inner tubular strength member and an outer tubular strength member that are coaxial and that are connected together by a ring of viscoelastic material, the inner tubular strength member being secured to said covering and the outer tubular strength member being provided with a fork possessing first and second facing tines, said first and second tines including respective first and second bores centered on a common connection axis so as to be suitable for receiving a first ball joint close to the pitch-variation axis of said blade.

More precisely, a first distance separating the connection axis from the pitch-variation axis of the blade is less than or equal to 10% of the chord of the blade containing said connection axis.

When a first ball joint is fastened to said first and second tines by a pin arranged on a first axis of revolution of said first ball joint, then the connection axis about which said first and second bores are centered coincides with the first axis of revolution.

Thus, if for example the connection axis intersects the pitch-variation axis of the blade, advantageously being orthogonal thereto, then the first axis of revolution of the first ball joint also intersects said pitch-variation axis.

Consequently, the blade of the invention is a blade having a working incorporated sleeve that transmits mechanical forces. Since the spar is secured to the covering of the sleeve, the sleeve necessarily transmits forces and contributes fully to the transmission of forces by virtue of its specific structural architecture.

A particular advantage of this configuration is that the fitted rotor hub is simplified overall. Using blades with an incorporated sleeve makes it possible to omit the intermediate part constituted by a sleeve such as that described in document FR 2 653 405.

Furthermore, a rotary damper is located inside the blade, more precisely inside the hollow sleeve. This arrangement of a rotary damper inside a hollow sleeve appears at first sight to be anomalous for a blade with an incorporated sleeve, insofar as the space available inside the hollow sleeve is particularly small. The rotary damper is suitable for connection to a first ball joint of a connecting rod.

Consequently, when the blade performs a drag movement, the outer tubular strength member of the damper is, so to speak, held in position by the connecting rod. Thus, the inner tubular strength member and the outer tubular strength member rotate differently about their common axis of symmetry. Under such conditions, the ring of viscoelastic material of the rotary damper is stressed in shear, thereby enabling the rotary damper to perform its function.

The very unusual arrangement of the rotary damper enables it to be connected to a connecting rod provided with a first ball joint, said first ball joint being located close to or on the pitch-variation axis of the blade.

Thus, the rotary damper is then stressed little or even not at all during variation of the pitch of the blade.

Furthermore, the blade of the invention may possess one or more additional characteristics as set out below.

For example, a top face of the inner tubular strength member is secured to the covering so that the rotary damper is fastened to the hollow sleeve incorporated in the blade.

Furthermore, at the root of the blade, the spar is subdivided into at least two bottom tapes in the pressure side of the blade and at least two top tapes in the suction side of blade, and the inner tubular strength member of the rotary damper is fastened to the covering between first and second top tapes.

Finally, at the root of the blade, the sleeve includes a notch in its trailing edge in order to be suitable for receiving a connecting rod carrying the first ball joint for fastening between the first and second tines of the fork of the outer tubular strength member.

Since the trailing edge of the sleeve is notched, it is possible to insert the connecting rod in the blade via its notch in order to fasten its first ball joint to the rotary damper.

In addition to the above-specified blade, the invention also provides a rotorcraft main rotor provided with a hub suitable for receiving a plurality of blades, said hub having firstly an inner portion suitable for being secured to a rotor mast and secondly one arm per blade, each arm comprising in succession an inner zone secured to the inner portion and possessing a cell, and then a peripheral zone.

This rotor is remarkable in that the blades are blades of the invention, each fastened to a laminated spherical abutment arranged in the cell of an arm, each blade including a rotary damper provided with an inner tubular strength member and an outer tubular strength member coaxial therewith, the inner and outer tubular strength members being connected together by a ring of viscoelastic material, the outer tubular strength member being provided with a fork provided with first and second tines having respective first and second bores centered on a connection axis, the rotor including one connecting rod per blade, the connecting rod having first and second ball joints at its first and second ends, the first ball joint of a connecting rod being fastened to the first and second tines of the fork of the rotary damper of the associated blade close to the pitch-variation axis of the associated blade, while the second ball joint of the connecting rod is fastened to fastener means of the hub on the flapping axis of the associated blade.

Thus, a first distance separating said connection axis from said pitch-variation axis of a blade is less than or equal to 10% of the chord of said blade containing the associated connection axis. For example, the connection axis of the first and second tines of a fork of a rotary damper intersects the pitch-variation axis of the associated blade so that the first axis of revolution of the associated first ball joint intersects said pitch-variation axis, the first axis of revolution of the first ball joint representing the axis of the first ball joint along which the pin extends that fastens the first ball joint to the first and second associated tines.

In addition, the second axis of revolution of a second ball joint intersects the flapping axis of the associated blade, the second axis of revolution of the second ball joint representing the axis of the second ball joint along which a pin extends that fastens the second ball joint to the associated fastener means.

Thus, each blade has a rotary damper located within it, an outer tubular strength of the rotary damper being fastened to the hub by a connecting rod.

The invention then constitutes a non-obvious alternative to previously-known embodiments insofar as it was necessary to overcome prejudices in order to house a rotary damper in a blade having an incorporated sleeve, and to connect it to the hub.

Furthermore, the invention serves to solve the drawbacks of said embodiments by having little or no repercussions since the coupling between the pitch and the flapping of the blade stresses the rotary damper little or not at all.

When the blade flaps, the connecting rod moves relative to the second ball joint and therefore does not modify the pitch of the blade.

Likewise, when the pitch of the blade is modified, the fork of the rotary damper moves relative to the first ball joint. The connecting rod moves hardly at all because of the position of the first ball joint and therefore generates a flapping movement that is small.

Advantageously, the rotor may include one or more of the following additional characteristics.

For example, each fastener means comprises a U-shaped branch that projects transversely from the arm of the hub to which the associated blade is fastened for the purpose of receiving the second ball joint of the connecting rod on the flapping axis of said blade.

Furthermore, each laminated spherical abutment comprises an outer radial strength member and an inner radial strength member connected together by a stack of rigid metal caps and of elastomer layers, the inner radial strength member being secured to the peripheral zone of the arm associated with the hub, and the spar of a blade is connected by pins to an outer radial strength member of a laminated spherical abutment so that the blade is fastened to the hub.

This characteristic makes it possible to obtain an assembly that is compact and thoroughly integrated.

Finally, each connecting rod presents an acute angle of less than 60 degrees relative to the pitch-variation axis of the associated blade.

Contrary to existing prejudices, it is not essential to seek to obtain an angle that is equal to 90 degrees. On the contrary, it is better to have an acute angle and to position the first and second ball joints appropriately.

As described below, the resulting rotor is particularly compact, with the invention being applicable to a rotor having at least three blades, and not three blades only.

BRIEF DESCRIPTION OF THE DRAWINGS

The invention and its advantages appear in greater detail in the context of the following description of an embodiment given by way of illustration with reference to the accompanying figures, in which:

FIG. 1 is a plan view of a rotor and a blade of the invention provided with a rotary damper having a fork including a connecting pin intersecting the pitch-variation axis of the associated blade;

FIG. 2 is an isometric view of a blade of the invention arranged on a hub;

FIG. 3 is a section view of the blade of the invention arranged on a hub; and

FIG. 4 is a plan view of the blade of the invention provided with a rotary damper having a fork including a connection pin close to the pitch-variation axis of the associated blade.

MORE DETAILED DESCRIPTION

Elements that are present in more than one of the figures are given the same references in each of them.

FIG. 1 shows a rotorcraft rotor 7 having three blades 1 arranged on a hub 50.

For this purpose, the hub 50 has an inner portion 51 in the form of a ring suitable for being secured to a rotor mast that is not shown in FIG. 1.

Furthermore, the hub 50 has three arms 52, i.e. one arm 52 per blade 1, distributed in equidistant manner around the periphery of the inner portion 51. Thus, each arm 52 possesses an inner zone 53 secured to the inner portion 51 of the hub 50 and a peripheral zone 55 opening out to the periphery of the hub 50.

It should be understood that the arms 52 and the inner portion 51 of the hub may constitute a single part, obtained by conventional machining, or indeed by making use of composite materials, with the hub 50 then being made as a single block.

Furthermore, each arm 52 is pierced vertically in its inner zone 53 so as to present a cell 54 suitable for receiving a hinge suitable for being fastened to a blade 1.

More precisely, a laminated spherical abutment 70 is arranged inside each cell, each laminated spherical abutment being secured firstly to the peripheral zone of the associated arm, and secondly to a blade 1.

For this purpose, each blade 1 is a blade possessing an incorporated hollow sleeve 10 having its outer covering 4 secured to the spar 3 of the blade 1. The wall 11 of the sleeve 10 is then a working wall that transmits mechanical forces.

Thus, the blades shown have first and second top tapes 32', 32", and bottom tapes (not visible in FIG. 1, given the viewing angle), these top and bottom tapes being secured to the covering 4 of the sleeve 10.

Furthermore, at the root 5 of the blade 1, these tapes of the spar 3 are wound around fastener pins at the corresponding laminated spherical abutments. For example, the first and second top tapes of a blade are wound around a common pin so as to be fastened to an outer radial strength member 71 of a laminated spherical abutment, as shown in FIG. 1.

Furthermore, in order to be damped in drag, each blade 1 is fitted internally with a rotary damper 20, each rotary damper 20 being arranged inside the hollow sleeve 10 of a blade and being secured to the wall of said hollow sleeve 10 between the first and second top tapes 32' and 32".

To be complete, the drag damper device of each blade 1 is also provided with a connecting rod 40 connecting a rotary damper 20 to the hub 50. More particularly, the connecting rod 40 is a rigid rod of constant length, optionally of adjustable length, provided with a first ball joint 41 at its first end 40' and with a second ball joint 42 at its second end 40".

Reference may be made to document FR 2 653 405 in order to have a description of such a connecting rod.

Under such conditions, the first ball joint 41 of a connecting rod 40 co-operates with a fork 25 of a rotary damper 20. The arrangement of the rotary damper is such that the first ball joint is then arranged in the vicinity of the pitch-variation axis AX1 of the associated blade 1.

More precisely, in the example of FIG. 1, a first axis of revolution AR2 of the first ball joint 41 is disposed on the pitch-variation axis AX1 of the blade 1. Conversely, in the example of FIG. 4, the first axis of revolution AR2 of the first ball joint 41 is disposed at a first distance DIS1 from the pitch-variation axis AX1 of the blade 1, which first distance is less than or equal to 10% of the chord CO containing said first axis of revolution AR2.

With reference to FIG. 1, the second ball joint 42 of the connecting rod 40 co-operates with fastener means 56 of the associated arm 52 of the hub 50.

Advantageously, the fastener means 56 comprise a U-shaped branch projecting transversely from the arm along the flapping axis AX2 of the blade so that the second ball joint 42 is fastened to the hub 50 by being placed on the flapping axis AX2 of the blade to which it is connected. A second axis of revolution AR3 of the second ball joint thus intersects the flapping axis AX2 of the blade.

Consequently, with the first ball joint 41 arranged on the pitch-variation axis AX1 of the blade 1 and the second ball joint 42 arranged on the flapping axis AX2 of the blade 1, the connecting rod 40 does not run any risk of interfering with the flapping and pitch couplings of said blade 1.

Finally, it can be seen that each connecting rod 40 presents an acute angle $\alpha$ of less than 60 degrees relative to the pitch-variation axis AX1 of the associated blade 1, the pitch-variation axis AX1 coinciding, in the example shown, with a direction D that connects an axis of symmetry AX3 of the associated rotary damper 20 with the first axis of revolution AR2 of the first ball joint 41 fastened to said rotary damper 20.

Contrary to existing prejudices, it is therefore not essential for the angle $\alpha$ to be equal to 90 degrees, thereby making it possible firstly to position the first and second ball joints at specific locations, and secondly to limit the overall size of the damper device.

FIG. 2 is an isometric view of the rotor 7 of the invention, the hub 50 being shown fitted with only one blade in order to clarify the figure.

FIG. 2 shows in particular that the top tapes 32' and 32" and the bottom tapes 31 of the blade 1 are fastened via pins 90 to an outer radial strength member 71. As explained below, this outer radial strength member represents a component element of a laminated spherical abutment that is secured in particular to the peripheral zone 55 of an arm 52 of the hub 50.

Furthermore, in order to use a connecting rod 40 to connect the U-shaped branch of the fastener means 56 projecting from the arm 52 to the rotary damper 20 that is secured to the covering 4 of the sleeve 10 in the root 5 of the blade and between the first and second top tapes 32' and 32" of the spar 3, it is appropriate for this connecting rod to be able to penetrate into the inside of the blade 1.

Thus, at the root 5 of the blade 1, the sleeve 10 includes a notch 6 in its trailing edge 10'. The first end of the connecting rod 40 is then capable of entering into the inside of the hollow sleeve 10 of the blade 1 in order to be fastened to a fork of the rotary damper 20.

FIG. 3 is a fragmentary section view of a rotor 7 fitted with a blade 1 of the invention, the blade being arranged on a hub 50 with its inner portion 51 secured to a rotor mast 60.

The blade 1 is provided with a hollow sleeve 10 having its wall 11 including the outer covering 4 and the spar 3 of the blade. Thus, the top tapes 32' of the spar are secured to the covering 4 via the suction side 1" of the blade 1, while the bottom tapes 31 of the spar are secured to the covering 4 via the pressure side 1' of the blade 1.

Furthermore, in order to be fastened to an arm 52 of the hub 50, the blade 1 is secured to a laminated spherical abutment arranged in a cell 54 of said arm 52.

The laminated spherical abutment then includes an outer radial strength member 71, to which the top and bottom tapes of the blade 1 are connected via pins, and an inner radial strength member 72. It should be observed that the inner and outer radial strength members 72 and 71 are connected together by a stack 73 of rigid metal caps and of elastomer layers.

Furthermore, the inner radial strength member 72 includes a convex spherical cap 73 together with two lugs 74' and 74" that are disposed respectively above and below the peripheral zone 55 of the arm 52. Reference can be made to the literature, and in particular to document FR 2 653 405 in order to obtain further details about the spherical abutment.

Thus, the laminated spherical abutment serves to fasten the blade 1 to the hub 50.

In addition, the blade 1 possesses a rotary damper 20 inside its hollow sleeve 10.

Thus, the rotary damper includes an inner tubular strength member 21 fastened to the covering 4 of the sleeve 10 by conventional means, such as bolts 91. For example, a top face 21' of the rotary damper 20 is secured to the covering 4 of the wall 11 of the sleeve 10 in the suction side 1" of the sleeve 10.

Furthermore, the rotary damper 20 is provided with an outer tubular strength member 22 that is coaxial with the inner tubular strength member 21 and that therefore has the same axis of symmetry AX3. This outer tubular strength member 22 is connected to the inner tubular strength member by a ring 23 of viscoelastic material.

Finally, in order to be capable of being fastened to the first ball joint 41 having a first axis of revolution AR2 as located at the first end 40' of the connecting rod, the outer tubular strength member 22 includes a fork 25.

Consequently, the fork 25 presents first and second tines 26, 27 for receiving the first ball joint. The first and second tines 26, 27 present respective first and second bores 28', 28" centered on a common connection axis AR1, with a pin 100 being inserted successively through the first bore 28' of the first tine 26, through a central hole 41' in the first ball joint 41 extending along the first axis of revolution AR2, and then through the second bore 28" of the second tine 27 in order to connect the connecting rod 40 to the rotary damper 20.

The connection axis AR1 of the fork 25 and the first axis of revolution AR2 of the first ball joint 41 then coincide when the connecting rod 40 is fastened to the associated rotary damper 20.

Thus, in the example shown in FIG. 1, the connection axis AR1 of the fork 25 of the rotary damper 20 of a blade intersects the pitch-variation axis AX1 of the blade. In contrast, in the example shown in FIG. 4, the connection axis AR1 lies at a first, non-zero distance DIS1 from the pitch-variation axis AX1.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A rotorcraft blade comprising:
at least one spar;
an outer covering formed by a hollow sleeve with a wall, said outer covering secured to said at least one spar to form a pressure side and a suction side of the blade; and
a rotary damper having an inner tubular strength member and an outer tubular strength member that are coaxial and that are connected together by a ring of viscoelastic material, said inner tubular strength member being secured to said covering and said outer tubular strength member having a fork possessing first and second facing tines, said first and second tines including respective first and second bores centered on a connection axis (AR1) so as to be suitable for receiving a first ball joint close to a pitch-variation axis (AX1) of said blade, a first distance (DIS1) separating the connection axis (AR1) from the pitch-variation axis (AX1) of the blade being less than or equal to 10% of the chord (CO) of the blade containing said connection axis (AR1).

2. A blade according to claim 1, wherein said connection axis (AR1) intersects said pitch-variation axis (AX1).

3. A blade according to claim 1, wherein a top face of said inner tubular strength member is secured to the covering.

4. A blade according to claim 1, wherein, at the root of said blade, said spar is subdivided into at least two bottom tapes in the pressure side of the blade and at least two top tapes in the suction side of blade, and said inner tubular strength member of said rotary damper is fastened to said covering between first and second top tapes.

5. A blade according to claim 1, wherein, at the root of said blade, said sleeve includes a notch in its trailing edge in order to be suitable for receiving a connecting rod carrying said first ball joint for fastening between the first and second tines of the fork of the outer tubular strength member.

6. A rotorcraft main rotor comprising:
a plurality of blades, each blade according to claim 1;
a hub suitable for receiving the plurality of blades, said hub having firstly an inner portion suitable for being secured to a rotor mast and secondly one arm per blade, each arm comprising in succession an inner zone secured to said inner portion and possessing a cell, and then a peripheral zone, wherein each blade fastened to a laminated spherical abutment arranged in the cell of the associated arm,
a plurality of connecting rods, with one connecting rod per blade, each connecting rod having first and second ball joints at its first and second ends, wherein said first ball joint is fastened to the first and second tines of the fork of the rotary damper of the associated blade close to the pitch-variation axis (AX1) of said associated blade, wherein the second ball joint is fastened to fastener means of said hub on a flapping axis (AX2) of said associated blade.

7. A rotor according to claim 6, wherein each fastener means comprises a U-shaped branch projecting transversely from the arm of the hub to which the associated blade is fastened.

8. A rotor according to claim 6, wherein each laminated spherical abutment comprises an outer radial strength member and an inner radial strength member connected together by a stack of rigid metal caps and of elastomer layers, said inner radial strength member being secured to the peripheral zone of the associated arm of the hub, and said at least one spar of one of the plurality of blades is connected by pins to the outer radial strength member of the associate laminated spherical abutment so that the blade is fastened to the hub.

9. A rotor according to claim 6, wherein each connecting rod presents an acute angle ($\alpha$) of less than 60 degrees relative to the pitch-variation axis (AX1) of the associated blade.

10. A rotorcraft blade comprising:
a spar;
an outer covering secured to said spar to form a pressure side and a suction side of the blade; and
a rotary damper having an inner tubular strength member and an outer coaxial tubular strength member connected together by a ring of viscoelastic material, said inner tubular strength member connected to said outer covering, said outer tubular strength member having a fork possessing first and second facing tines, said first and second tines including respective first and second bores centered on a connection axis (AR1) and configured to receive a first ball joint close to a pitch-variation axis (AX1) of said blade;
wherein the connection axis (AR1) is separated from the pitch-variation axis (AX1) of the blade by a first distance (DIS1) less than or equal to 10% of the chord (CO) of the blade containing said connection axis (AR1).

11. The rotorcraft blade according to claim 10, wherein the first and second times of the fork extend along the pitch variation axis (AX1).

12. The rotorcraft blade according to claim 10, wherein the pressure side and the suction side of the outer covering cooperate to form a hollow sleeve that houses said spar within.

13. The rotorcraft blade according to claim 12, wherein the rotary damper is housed within the hollow sleeve of the outer covering.

14. A rotorcraft main rotor comprising:
a plurality of blades, each blade according to claim 10;
a hub configured to receive each of the blades, said hub having an inner portion configured to be secured to a rotor mast and a plurality of arms, each arm corresponding to a respective blade; and
a plurality of connecting rods, each connecting rod corresponding to a respective blade and having first and second ball joints at first and second ends respectively;
wherein said first ball joint of each of the connecting rods is fastened to the first and second tines of the rotary damper of the associated blade close to the pitch-variation axis (AX1) of said associated blade; and
wherein the second ball joint of each the connecting rods is fastened to the hub on a flapping axis (AX2) of said associated blade.

15. The rotorcraft main rotor according to claim 14, wherein the hub has a plurality of U-shaped branches, each branch projecting transversely from a respective arm of the hub, each branch configured to receive one of the second ball joints.

16. A rotorcraft blade comprising:
a spar;
an outer covering secured to said spar to form a pressure side and a suction side of the blade, the pressure side and the suction side cooperating to form a hollow sleeve that houses said spar within; and
a rotary damper housed within the hollow sleeve, the rotary damper having a first member and second member connected together by a viscoelastic material, said first member connected to said outer covering, said second member configured to receive a first ball joint close to a pitch-variation axis (AX1) of said blade;
wherein the connection axis (AR1) is separated from the pitch-variation axis (AX1) of the blade by a first distance (DIS1) less than or equal to 10% of the chord (CO) of the blade containing said connection axis (AR1).

* * * * *